(12) United States Patent
Soyris

(10) Patent No.: US 6,886,790 B2
(45) Date of Patent: May 3, 2005

(54) STAND-OFF FOR FIXING THERMAL PROTECTION PANELS

(75) Inventor: Philippe Soyris, Bordeaux (FR)

(73) Assignee: Snecma Propulsion Solide, Le Haillan (FR)

( * ) Notice: Subject to any disclaimer, the term of this patent is extended or adjusted under 35 U.S.C. 154(b) by 0 days.

(21) Appl. No.: 10/260,725

(22) Filed: Sep. 30, 2002

(65) Prior Publication Data

US 2004/0011942 A1 Jan. 22, 2004

(30) Foreign Application Priority Data

Jul. 22, 2002 (FR) .............................................. 02 09258

(51) Int. Cl.$^7$ ................................................. B64C 1/12
(52) U.S. Cl. ....................... 248/200; 248/913; 248/300; 52/677; 244/158 A
(58) Field of Search ................................ 248/200, 300, 248/694, 615, 618, 188.1, 911, 912, 913, 608, 609, 613, 612; 244/158 A, 121, 131, 132; 89/36.11; 52/126.6, 677; 403/6, 7, 389, 397

(56) References Cited

U.S. PATENT DOCUMENTS

| | | | | |
|---|---|---|---|---|
| 1,867,365 A | * | 7/1932 | Lee .............................. | 248/612 |
| 3,894,372 A | | 7/1975 | Roberts et al. ................ | 52/223 |
| 4,012,879 A | | 3/1977 | Aubert et al. .................. | 52/508 |
| 4,456,208 A | | 6/1984 | MacConochie et al. ...... | 244/158 |
| 4,570,911 A | * | 2/1986 | Konishi ....................... | 267/219 |
| 4,713,275 A | * | 12/1987 | Riccitiello et al. ............. | 428/76 |
| 4,725,046 A | * | 2/1988 | Sugino ................... | 267/140.13 |
| 4,919,366 A | * | 4/1990 | Cormier ..................... | 244/160 |
| 5,216,886 A | | 6/1993 | Ewing .......................... | 60/752 |
| 5,271,687 A | * | 12/1993 | Holka et al. ................ | 403/233 |
| 5,489,074 A | * | 2/1996 | Arnold et al. .......... | 244/158 A |
| 5,560,569 A | | 10/1996 | Schmidt ..................... | 244/117 |
| 5,575,439 A | * | 11/1996 | Heinze et al. .............. | 244/131 |
| 6,293,496 B1 | * | 9/2001 | Moe ........................... | 244/120 |
| 6,464,213 B1 | * | 10/2002 | Kojima ................... | 267/140.14 |
| 6,505,794 B2 | * | 1/2003 | Myers et al. ........... | 244/158 A |
| 6,536,594 B2 | * | 3/2003 | Hayashi ..................... | 248/632 |

FOREIGN PATENT DOCUMENTS

| | | |
|---|---|---|
| JP | 10 226400 | 11/1998 |
| WO | WO 01 03916 A | 1/2001 |

* cited by examiner

*Primary Examiner*—Ramon O. Ramirez
*Assistant Examiner*—Ingrid Weinhold
(74) *Attorney, Agent, or Firm*—Weingarten, Schurgin, Gagnebin & Lebovici LLP

(57) ABSTRACT

In order to accommodate differential expansion between thermal protection panels and a structure to be protected, the present invention provides a stand-off for holding the panels, the stand-off comprising a first portion allowing displacements to take place in a first direction and a second portion allowing displacements to take place in a second direction. Each of the two portions also presents a high degree of stiffness in a direction corresponding to tear-off and crushing forces applies to the panels. The stand-off is made as a single piece having first and second recesses formed therein in order to make the first and second portions respectively in determined orientations so that the resulting stand-off allows displacements to take place in two distinct directions perpendicular to the tear-off and crushing directions.

8 Claims, 3 Drawing Sheets

STAND-OFF FOR FIXING THERMAL PROTECTION PANELS

FIELD OF THE INVENTION

The present invention relates to the field of thermal protection, and more particularly to fixing panels in this type of protection.

PRIOR ART

Thermal protection devices of the kind present on vehicles for reentering the atmosphere, for example, are generally made up of panels which act not only to provide the outside wall of the vehicle with mechanical strength, but also to provide it with thermal insulation.

Nevertheless, recent projects have shown that it can be advantageous to separate the outside wall function from the thermal insulation function. Under such circumstances, the thermal protection device can comprise a panel of thermostructural composite material constituting the outside wall of the device, together with internal insulation placed between the inside face of the panel and the wall of the structure to be protected. Under such circumstances, the panels need to be fixed at a distance from the wall of the structure that is to be protected in order to leave a space between the panel (hot structure) and the outside wall of the structure (cold structure).

Thermal protection devices of the kind mentioned above and studied for vehicles that reenter the atmosphere are constituted by a heat shield of thermostructural composite material which protects the vehicle from the high temperature heat fluxes it encounters during its flight. This type of shield is made up of a plurality of panels which are adjacent to one another and which are fixed to the wall of the vehicle to be protected. It is essential for vehicle safety that the thermal protection panels be fixed in reliable manner. Given the loads to which the panels are subjected, particularly when reentering the atmosphere, it is essential for the fixing systems to be very stiff, at least in the direction of the external forces applied against the thermal protection.

In addition, with such thermal protection, differential expansion between the panels which are subjected to the heat flux, referred to as "hot" structures, and the structure to be protected, referred to as the "cold" structure, leads to the panels moving considerably relative to the structure, or vice versa. Consequently, the fixings used for the panels must accommodate displacements of the panels relative to the structure onto which they are fixed.

The present trend with panels for thermal protection is to increase their size in order to reduce the number of configurations. This increase in size gives rise to an increase in the number of fixings per panel, and consequently to a reduction in the degrees of freedom available to the hot and cold structures for their differential mechanical expansions due to thermal loading.

There are a wide variety of solutions for allowing hot panels to move relative to the cold structure.

The fixing systems commonly studied comprise mechanical connections which present good strength in the tear-off and crushing direction (compression and buckling) while allowing displacements in one degree of freedom by deforming elastically to absorb differential expansion between the two structures. That type of connection is fairly simple to make and can be implemented in various shapes such as a simple rectilinear bar that is sufficiently thin to be able to deform in one direction. That type of mechanical connection can be used with panels of small size which require only a small number of attachment points in order to conserve as many degrees of freedom as possible. Such connections can also be used when it is easy to determine the direction in which relative deformation takes place. Nevertheless, it must be possible to guarantee that deformation takes place in one direction only throughout operation, which means, in the case of a vehicle reentering the atmosphere, for example, that only one kind of thermal loading can be taken into consideration throughout the mission. Consequently, it appears difficult to provide such a mechanical connection in satisfactory manner, particularly since even when there is only one thermal load it is still necessary to be able to position the fixing systems very accurately relative to the deformation they are to absorb. If connections which deform in one direction only are not positioned accurately in orientation, then transverse forces can be generated leading to the fastening or to the structure breaking.

In order to remedy that drawback, proposals have been made to use connecting rods fitted with ball-and-socket joints at one end in order to allow displacements to take place in a plurality of directions or degrees of freedom. However, problems due to transverse forces remain. In addition, with such connections, the hot structure moves relative to the cold structure by the connecting rods turning, so there is no elastic return when the load is removed.

In order to avoid transverse forces, the connecting rods could be mounted via ball-and-socket joints at both ends, however when the panels expand, displacement thereof in a direction parallel to the outside aerodynamic shape would give rise to displacement in the normal direction, in turn giving rise to excessive modification to the aerodynamic shape defined by the panels. The problem of elastic return would also remain.

Finally, another solution that can be envisaged consists in fixing the mechanical connections of each system to the cold structure via oblong holes so as to leave one degree of freedom per fixing system. That means that the behavior of the system relies on the ability of various elements to slide. Unfortunately, it is known that materials are much rougher in space than in the atmosphere. In addition, thermal loading takes place at the same time as compression loading on the panels which makes sliding between the elements even more difficult.

OBJECT AND BRIEF SUMMARY OF THE INVENTION

The invention seeks to remedy the above-specified drawbacks and to provide a system for fixing thermal protection panels that enables the panels to move relative to the wall of the structure to be protected in a plurality of directions without degrading the reliability with which the panel is attached, particularly against applied mechanical loads, while nevertheless providing for elastic return after loading.

These objects are achieved by a stand-off for holding a thermal protection panel on a structure to be protected, wherein the stand-off comprises a first portion suitable for fixing to the structure to be protected, said first portion allowing displacements to take place in a first direction substantially parallel to the plane of the panel, and a second portion situated above said first portion and suitable for being connected to the panel, said second portion allowing displacements to take place in a second direction substantially parallel to the plane of the panel and perpendicular to said first direction, and wherein said stand-off presents stiffness in a third direction substantially perpendicular to the first and second directions.

The stand-off obtained in this way allows the panel to move relative to the structure to be protected, and vice versa, in two distinct directions, while nevertheless conserving good stiffness against crushing and tear-off forces applied to the panel.

More particularly, the stand-off is made as a single piece in which first and second recesses are made in order to form said first and second portions respectively. The single piece can be made of a metal alloy that withstands high temperatures.

In an embodiment, the first portion comprises two uprights and two tabs, each tab extending from the bottom end of a respective upright and serving to fix the stand-off to the structure that is to be protected.

In another embodiment, the second portion comprises two uprights interconnected at their top ends by a cross-member. A hole may be provided through the cross-member to allow attachment means to pass through.

In yet another embodiment, the second portion comprises two uprights and two tabs, each connected to the top end of a respective one of the uprights to fix the stand-off to the panel or to an element thereof. In some cases, the second portion comprises a single upright extended by a fixing tab.

The present invention also provides thermal protection for fixing on a structure to be protected, said protection comprising a plurality of panels held on the structure to be protected by stand-offs as described above.

BRIEF DESCRIPTION OF THE DRAWINGS

Other characteristics and advantages of the invention will appear from the following description of particular embodiments of the invention given as non-limiting examples and with reference to the accompanying drawings, in which.

DETAILED DESCRIPTION OF EMBODIMENTS OF THE INVENTION

The above-described invention relates mainly to a stand-off in a thermal protection structure. In the present description, the term "stand-off" designates an element for fixing a mechanical thermal protection panel on the structure of a vehicle such as a vehicle for reentering the atmosphere. More precisely, it is an intermediate element that provides a rigid mechanical connection between the panel and the structure of the vehicle, serving to lengthen the thermal conduction path so as to isolate the structure, and accommodating differential deformation of the panel relative to the structure during thermomechanical loading.

The thermal protection function under consideration herein is to protect a structure such as a vehicle for reentering the atmosphere or a cryogenic tank against high temperature heat fluxes that are encountered in its operating environment. For this purpose, the thermal protection device comprises a panel which receives the high temperature heat flux on its outside face and thermal insulation placed between the panel and the structure. The panel performs several functions: it provides strength against mechanical loading (differences between inside and outside pressures, structural deformation, . . . ); it maintains outside shape (aerodynamic shape); it protects the insulation against the outside environment (abrasion, fast slows, rain, hail, plasma, . . . ); and it acts as a reflective shield.

The solution of the present invention consists in proposing a fixing stand-off which allows displacements to take place not in one direction only but in two directions simultaneously, while nevertheless conserving stiffness in the direction for tearing panels from the wall of the structure to be protected and for crushing them against it.

To this end, the fixing stand-off of the invention is constituted mainly by a single piece presenting two distinct portions of small thickness so as to allow relative elastic deformation to take place in a direction (degree of freedom) that is substantially perpendicular to the tear-off and crushing direction so as not to weaken stiffness. The way these two reduced thickness portions are formed relative to each other serves to provide a stand-off that presents a high degree of stiffness against forces orthogonal to the panels while still allowing displacements to take place in two distinct directions.

Because of the two distinct displacement directions allowed by each stand-off, the risk of displacements becoming jammed is considerably reduced even when the number of stand-offs required per panel is large.

Figure 1:
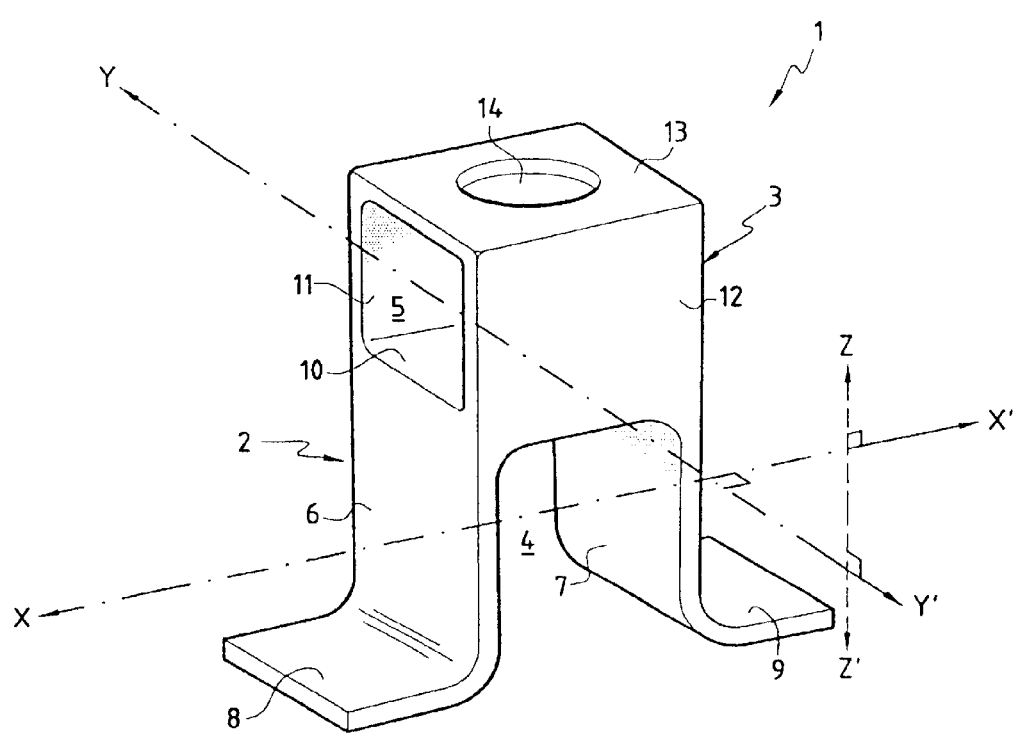
FIG. 1 is a perspective view showing a panel fixing stand-off constituting a first embodiment of the invention.

FIG. 1 shows a first embodiment of a stand-off of the invention for fixing thermal protection panels. The stand-off 1 comprises a single piece having two recesses 4 and 5 formed therein to define first and second portions 2 and 3 respectively. Since the stand-off is made as a one-piece structure, the recesses 4 and 5 can be made by machining in the bulk of the piece. Such a stand-off structure could also be obtained by molding.

The first portion 2 formed in this way thus comprises two parallel uprights 6 and 7 defining a first displacement direction along an axis XX'. In other words, the first portion 2 allows displacement to take place in one direction by elastic deformation of the uprights 6 and 7. The axis XX' is substantially perpendicular to an axis ZZ' which corresponds to the tear-off and crushing directions so as to avoid weakening fixing stiffness in these directions.

Two tabs 8 and 9 extend outwards from the respective bottom ends of the uprights 6 and 7. The tabs 8 and 9 form a base for attaching the stand-off 1 to the wall of the structure to be protected, known as the "cold" structure. The tabs can be fixed to the cold structure by brazing 32, by fasteners of the nut-and-bolt type, or by any other attachment device.

The second portion 3 is formed above the first portion 2, with the non-hollowed out portion of the piece between these two portions forming a cross-member 10. Like the first portion 2, the second portion 3 comprises two parallel uprights 11 and 12 defining a second direction of displacement along an axis YY' and providing stiffness in the tear-off and crushing directions ZZ'.

The portion 3 also comprises a top cross-member 13 which serves as a fixing base for the panel. For this purpose, a hole 14 may be made through the cross-member 13 to pass an attachment means. The portion 2 allows displacement to take place in the direction XX' while the portion 3 allows displacement to take place in the direction YY'. The element can be turned through 90° in order to interchange these directions as a function of the required respective flexibilities (or stiffnesses).

Figure 2:
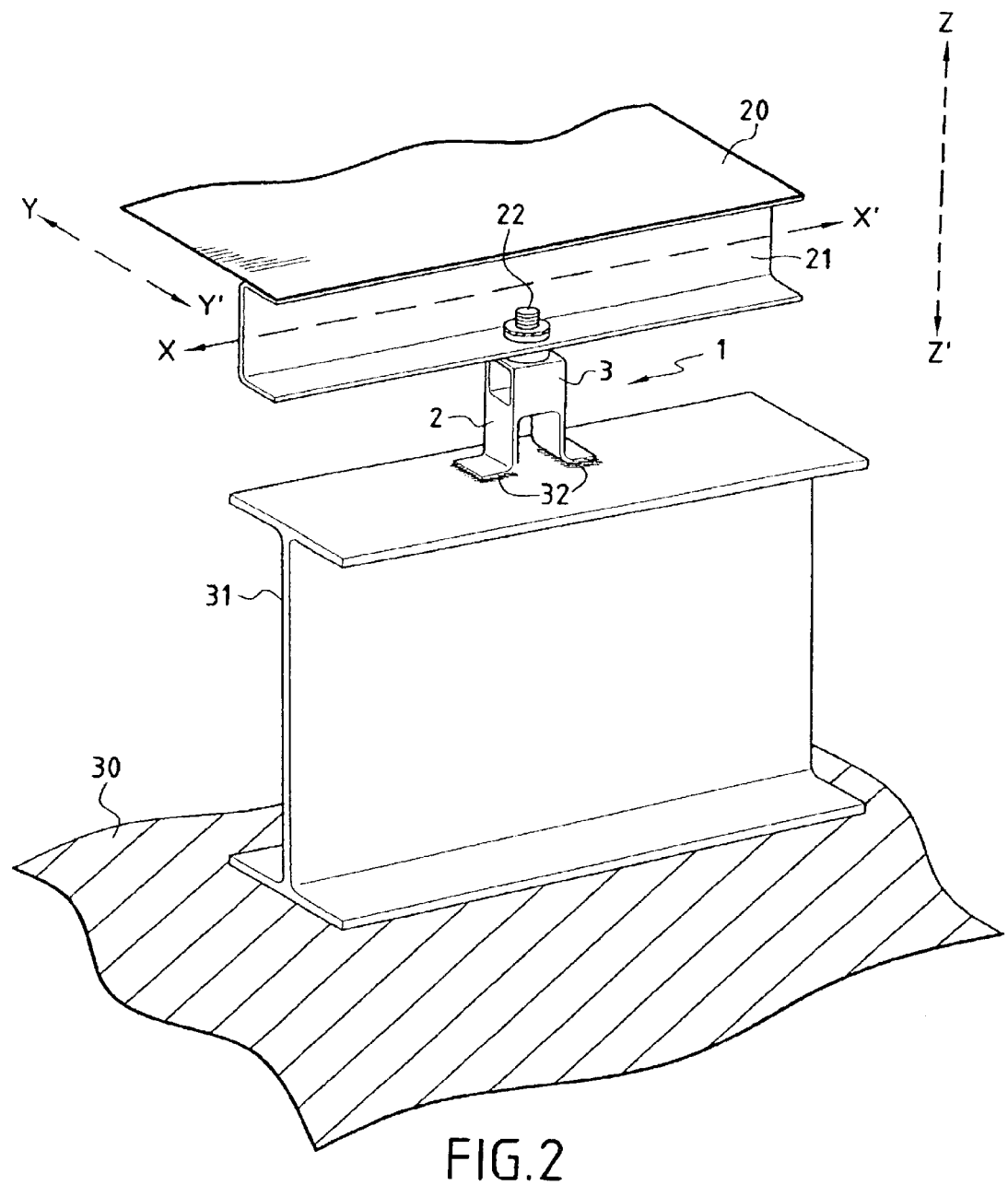
FIG. 2 is a fragmentary perspective view showing how the FIG. 1 fixing stand-off is used in thermal protection including panels.

FIG. 2 shows an example of the FIG. 1 stand-off in use. A thermal protection panel 20 is fixed via a stiffener 21 to the stand-off 1. More precisely, the stiffener 21 is fixed to the portion 3 of the stand-off 1 via clamping means 22 of the nut-and-bolt type penetrating into a through hole formed both in the flange of the stiffener and in the top cross-member 13 of the portion 3 as shown in FIG. 1. The portion 2 is fixed to another stiffener 31, e.g. by bolting, serving to provide a connection with a wall 30 of a cold structure such as the outside wall of a vehicle for reentering the atmosphere. Because the stand-off 1 is interposed between the wall 30 and the panel 20, the panel is held with considerable stiffness in the direction ZZ' corresponding to the direction in which tear-off or crushing forces are applied, while nevertheless being capable of moving in the directions XX' and YY' substantially parallel to the plane of the panel in order to accommodate displacements in the event of differential thermal expansion between the cold structure and the hot structure.

Figure 3:
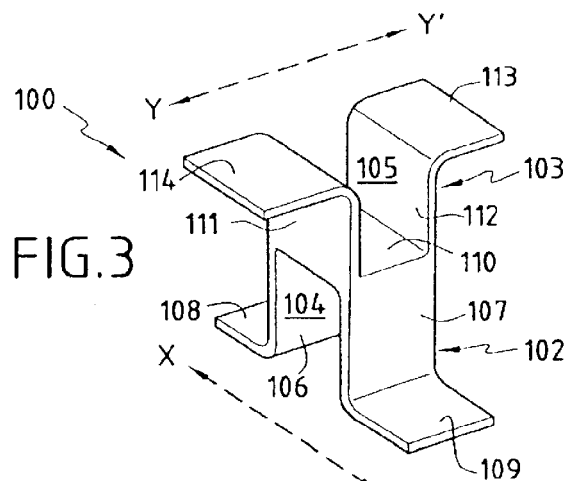
FIG. 3 is a perspective view showing a panel fixing stand-off constituting a second embodiment of the invention.
Figure 4:
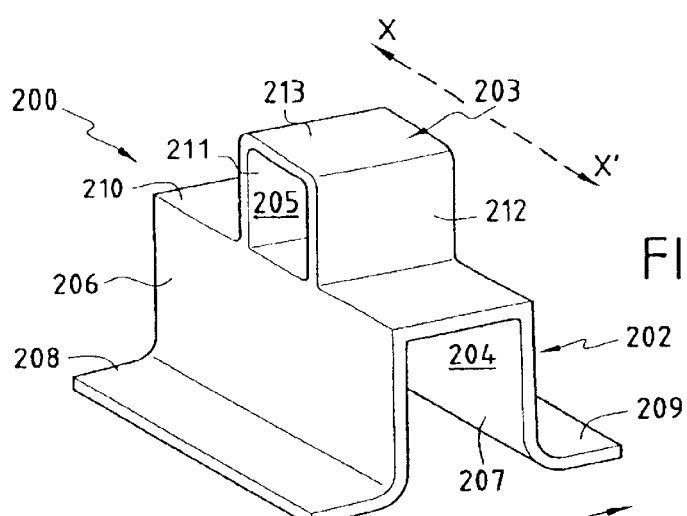
FIG. 4 is a perspective view showing a panel fixing stand-off constituting a third embodiment of the invention.
Figure 5:
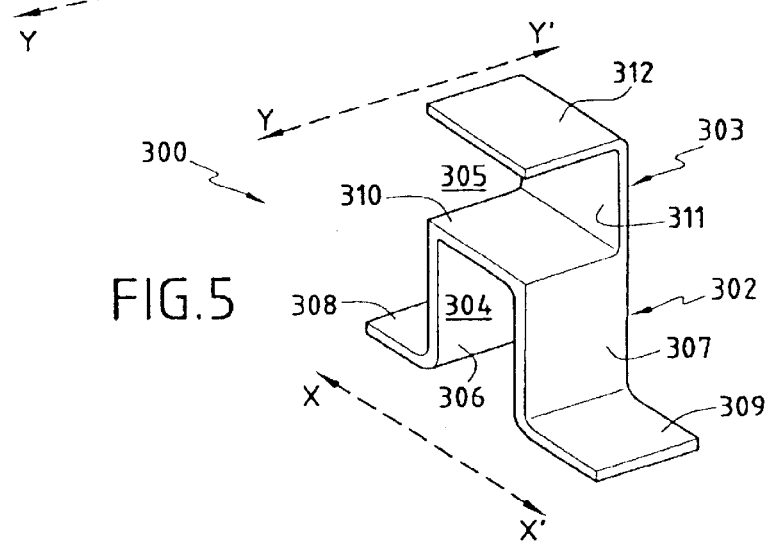
FIG. 5 is a perspective view showing a panel fixing stand-off constituting a fourth embodiment of the invention.

Numerous embodiments of stand-offs in accordance with the invention can be devised. As explained above, the person skilled in the art will have no difficulty in devising a wide variety of embodiments. FIGS. 3 to 5 show possible embodiments which enable the desired effects to be obtained.

In FIG. 3, a stand-off 100 comprises two portions 102 and 103. The first portion 102 comprises two uprights 106 and 107 obtained by making a recess 104. These uprights are extended by respective tabs 108 and 109 for fixing to the cold structure. The portion 103 is connected to the portion 102 via a cross-member 110 such that the uprights 111 and 112 that result from making a recess 105 define a displacement direction along an axis YY' which is perpendicular to the displacement direction along an axis XX' as defined by the uprights of the portion 102. The second portion 103 also has two tabs 113 and 114 forming a fixing base for the panel. Like the support element in FIG. 1, a hole may be provided through each tab 113, 114 to enable attachment means to pass through.

FIG. 4 shows a type of configuration for a stand-off 200 that comprises a single piece having two recesses 204 and 205 formed therein to define first and second portions 202 and 203, respectively. The first portion 202 comprises two parallel uprights 206 and 207 defining a first displacement direction along an axis YY'. Two tabs 208 and 209 extend outwards from the respective bottom ends of the uprights 206 and 207. The second portion 203 is formed above the first portion 202 with a cross-member 210 formed between these two portions 202 and 203. Like the first portion 202, the second portion 203 comprises two parallel uprights 211 and 212 defining a second direction of displacement along an XX'. The portion 203 also comprises a top cross-member 213, which serves as a fixing base. As shown in FIG. 4, the stand-off 200 still comprises the two portions 202 and 203, but the first portion 202 is of larger dimensions than the second portion 203. In this embodiment, the panel is fixed on the top cross-member 213 which interconnects the two uprights 211 and 212 of the portion 203. For this purpose, a hole may be provided through the cross-member 213 to pass attachment means.

FIG. 5 shows another type of configuration for a stand-off which can be obtained in accordance with the present invention. The stand-off 300 comprises a first portion 302 and a second portion 303. The first portion 302 has two uprights 306 and 307 interconnected by a cross-member 310 from which there extends a single upright 311 forming the second portion 303 which defines a displacement direction along an axis YY' perpendicular to the displacement direction along the axis XX' defined by the uprights 306 and 307 of the portion 302. The portion 302 has tabs 308 and 309 serving as attachment points to the cold structure. The portion 303 has an attachment tab 312 for attaching the panel, which tab may have a hole for passing attachment means.

The dimensioning of the stand-off, in particular concerning the thickness of its material, is determined as a function of a compromise that needs to be established between the desire for flexibility in the deformation directions and for stiffness and ability to withstand buckling normal thereto. Consequently, the thickness of the material constituting the elastic deformation portions, and more particularly the upright(s) of each portion, is preferably kept down to the minimum needed for providing stiffness.

The above-described support elements may be made of a metal alloy that withstands high temperatures such as "INCONEL"® or "WASPALOY"®. More generally, any material that withstands high temperatures and that presents suitable properties of stiffness and flexibility (Young's modulus to be determined by calculation) can be used to make the support elements of the fixing system of the invention. The ductile nature of the material may be advantageous to permit possible deformation or lengthening of the stand-off without it breaking, in order to conserve the attachment system until repair or maintenance can be performed and without losing the panel and thus putting the vehicle into danger.

In addition to allowing displacements to take place in two transverse directions while retaining a high degree of stiffness in the normal direction, the stand-off of the present invention presents the advantage of being compact and lightweight. This derives in particular from the fact that the stand-off is made as a one-piece structure. Since the stand-off is made as a single element, it is relatively easy to put into place and mount. Using such a structure, the stand-off also presents increased strength thus increasing its reliability correspondingly.

What is claimed is:

1. A stand-off for holding a thermal protection panel on structure to be protected, wherein the stand-off comprises a first portion suitable for fixing to the structure to be protected, said first portion allowing displacements to take place in a first direction substantially parallel to the plane of the panel, and a second portion situated above said first portion and suitable for being connected to the panel, said second portion allowing displacements to take place in a second direction substantially parallel to the plane of the panel and perpendicular to said first direction, and wherein said stand-off presents stiffness in a third direction substantially perpendicular to the first and second directions, wherein the stand-off is made as a single piece in which first and second recesses are made in order to form said first and second portions respectively.

2. The stand-off according to claim 1, wherein said single piece is constituted by a metal alloy that withstands high temperatures.

3. The stand-off according to claim 1, wherein said first portion comprises two uprights and two tabs, each tab extending from the bottom end of a respective upright and serving to fix the stand-off to the structure that is to be protected.

4. The stand-off according to claim 1, wherein the second portion comprises two uprights interconnected at their top ends by a cross-member.

5. The stand-off according to claim 4, wherein a hole is made through said cross-member to pass attachment means.

6. A stand-off according to claim 1, wherein the second portion comprises two uprights and two tabs, each connected to the top end of a respective one of the uprights to fix the stand-off to the panel or to an element thereof.

7. A stand-off according to claim 1, wherein the second portion comprises an upright and a tab connected to the top end of said upright for fixing the stand-off to the panel or to an element thereof.

8. Thermal protection for fixing on a structure to be protected, the protection comprising a plurality of panels held on the structure to be by stand-offs according to claim 1.

* * * * *

UNITED STATES PATENT AND TRADEMARK OFFICE
CERTIFICATE OF CORRECTION

| | | |
|---|---|---|
| PATENT NO. | : 6,886,790 B2 | Page 1 of 1 |
| APPLICATION NO. | : 10/260725 | |
| DATED | : May 3, 2005 | |
| INVENTOR(S) | : Philippe Soyris | |

It is certified that error appears in the above-identified patent and that said Letters Patent is hereby corrected as shown below:

Column 5, line 59, "an XX'" should read --an axis XX'--; and

Column 8, line 9 in claim 8, "be by" should read --be protected by--.

Signed and Sealed this

First Day of August, 2006

JON W. DUDAS
*Director of the United States Patent and Trademark Office*